(12) United States Patent
Taguchi

(10) Patent No.: US 10,227,900 B2
(45) Date of Patent: Mar. 12, 2019

(54) BOILER, COMBINED CYCLE PLANT, AND STEAM COOLING METHOD FOR BOILER

(71) Applicant: MITSUBISHI HITACHI POWER SYSTEMS, LTD., Kanagawa (JP)

(72) Inventor: Jun Taguchi, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/329,685

(22) PCT Filed: Sep. 2, 2015

(86) PCT No.: PCT/JP2015/074960
§ 371 (c)(1),
(2) Date: Jan. 27, 2017

(87) PCT Pub. No.: WO2016/047400
PCT Pub. Date: Mar. 31, 2016

(65) Prior Publication Data
US 2017/0211427 A1 Jul. 27, 2017

(30) Foreign Application Priority Data

Sep. 26, 2014 (JP) ................................ 2014-197522

(51) Int. Cl.
*F01K 23/10* (2006.01)
*F02C 6/08* (2006.01)
(Continued)

(52) U.S. Cl.
CPC .......... *F01K 23/106* (2013.01); *F01K 23/108* (2013.01); *F22G 5/12* (2013.01);
(Continued)

(58) Field of Classification Search
CPC ...... F01K 23/106; F01K 23/108; F01K 23/10; F01K 11/02; F01K 21/047; F02C 6/18;
(Continued)

(56) References Cited

U.S. PATENT DOCUMENTS 4,693,213 A * 9/1987 Yanai ................. B01D 53/8631
122/421
4,799,461 A * 1/1989 Shigenaka ............ F01K 23/108
122/1 C
(Continued)

FOREIGN PATENT DOCUMENTS

CN 1441156 9/2003
JP 61-155605 7/1986
(Continued)

OTHER PUBLICATIONS

Written Opinion dated Nov. 24, 2015 in corresponding International (PCT) Application No. PCT/JP2015/074960.
(Continued)

*Primary Examiner* — William H Rodriguez
(74) *Attorney, Agent, or Firm* — Wenderoth, Lind & Ponack, L.L.P.

(57) ABSTRACT

The purpose of the present invention is to decrease the loss of energy of flue gas when superheated steam is cooled and prevent heat efficiency from being decreased. A boiler is provided with: economizers (a medium-pressure economizer (13) and a high-pressure secondary economizer (18)) which heat water supplied by water supply pumps (a medium-pressure water supply pump (27) and a high-pressure water supply pump (28)); evaporators (a medium-pressure evaporator (16) and a high-pressure evaporator (21)) which evaporate the water that is heated by the economizers; and cooling devices (a medium-pressure system and a high-pressure system) which mix water, as a
(Continued)

coolant, which has passed through the economizers via the water supply pumps with steam.

7 Claims, 2 Drawing Sheets

(51) Int. Cl.
    *F22G 5/12*         (2006.01)
    *F02C 6/18*         (2006.01)
    *F22B 31/00*        (2006.01)
    *F22B 37/00*        (2006.01)

(52) U.S. Cl.
    CPC ................ *F02C 6/18* (2013.01); *F22B 31/00* (2013.01); *F22B 37/00* (2013.01); *Y02E 20/16* (2013.01)

(58) Field of Classification Search
    CPC .......... F22G 5/12; Y02E 20/16; F22B 1/1815; F22B 37/00; F22B 31/00
    See application file for complete search history.

(56) References Cited

U.S. PATENT DOCUMENTS

| | | | |
|---|---|---|---|
| 5,628,179 A | 5/1997 | Tomlinson | |
| 6,178,734 B1 | 1/2001 | Shibuya et al. | |
| 6,205,762 B1* | 3/2001 | Uematsu | F01K 23/10 60/39.182 |
| 6,338,241 B1 | 1/2002 | Shibuya et al. | |
| 6,389,797 B1* | 5/2002 | Sugishita | F01K 23/106 60/39.182 |
| 6,438,939 B1* | 8/2002 | Uematsu | F01K 23/10 60/39.182 |
| 6,823,674 B2* | 11/2004 | Schwarzott | F01K 23/106 60/39.182 |
| 2001/0023577 A1 | 9/2001 | Nagashima | |
| 2003/0037534 A1* | 2/2003 | Sugishita | F01K 23/106 60/39.182 |
| 2004/0025510 A1 | 2/2004 | Schwarzott | |
| 2017/0074164 A1* | 3/2017 | Uechi | F01K 7/22 |

FOREIGN PATENT DOCUMENTS

| | | |
|---|---|---|
| JP | 61-256105 | 11/1986 |
| JP | 3-14519 | 2/1991 |
| JP | 09-196301 | 7/1997 |
| JP | 9-329303 | 12/1997 |
| JP | 9329303 | * 12/1997 |
| JP | 10-212908 | 8/1998 |
| JP | 11-148315 | 6/1999 |
| JP | 11-200889 | 7/1999 |
| JP | 4090584 | 3/2008 |

OTHER PUBLICATIONS

International Search Report dated Nov. 24, 2015 in International (PCT) Application No. PCT/JP2015/074960.
Office Action dated Sep. 4, 2018 in corresponding Japanese Application No. 2014-197522, with English translation.
Korean Office Action dated Oct. 29, 2018 in corresponding Korean Patent Application No. 10-2017-7002338 with English translation.

* cited by examiner

FIG. 1

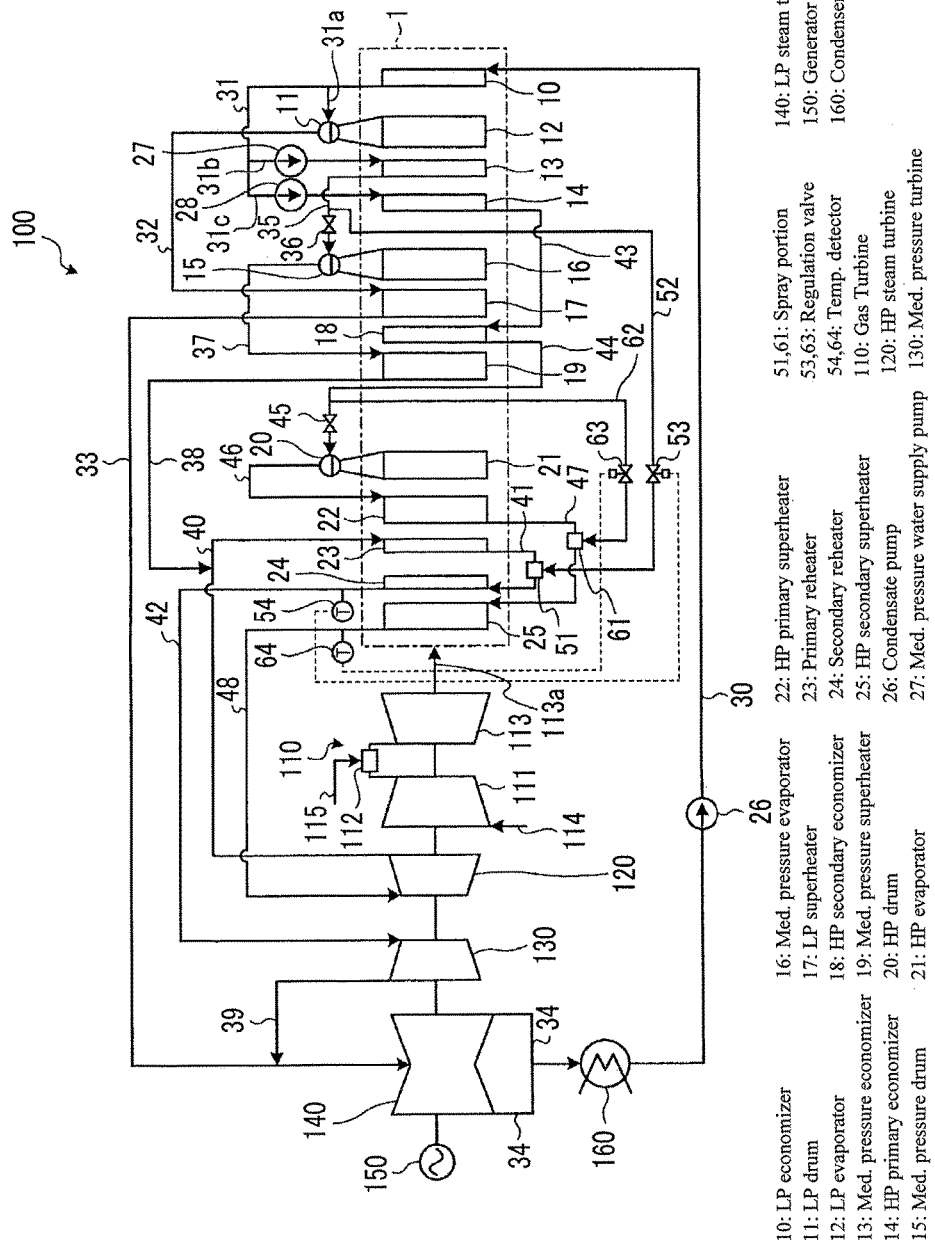

- 10: LP economizer
- 11: LP drum
- 12: LP evaporator
- 13: Med. pressure economizer
- 14: HP primary economizer
- 15: Med. pressure drum
- 16: Med. pressure evaporator
- 17: LP superheater
- 18: HP secondary economizer
- 19: Med. pressure superheater
- 20: HP drum
- 21: HP evaporator
- 22: HP primary superheater
- 23: Primary reheater
- 24: Secondary reheater
- 25: HP secondary superheater
- 26: Condensate pump
- 27: Med. pressure water supply pump
- 51,61: Spray portion
- 53,63: Regulation valve
- 54,64: Temp. detector
- 110: Gas Turbine
- 120: HP steam turbine
- 130: Med. pressure turbine
- 140: LP steam turbine
- 150: Generator
- 160: Condenser

BOILER, COMBINED CYCLE PLANT, AND STEAM COOLING METHOD FOR BOILER

TECHNICAL FIELD

The present invention relates to a boiler, a combined cycle plant, and a steam cooling method for a boiler.

BACKGROUND ART

For example, in the related art, PTL 1 discloses a boiler in which water is heated by an economizer using a flue gas, and saturated steam generated from a drum is turned into superheated steam by a superheater and supplied to a steam turbine. In addition, in order to cope with a case where the temperature of the superheated steam supplied to the steam turbine is high, PTL 1 discloses a spray device which, using water before being supplied to the economizer as a coolant, mixes the coolant with the superheated steam and cools the superheated steam at the outlet of the boiler so as to control the temperature of the superheated steam to a predetermined temperature.

CITATION LIST

Patent Literature

[PTL 1] Japanese Unexamined Utility Model Registration Application Publication No. 3-14519

SUMMARY OF INVENTION

Technical Problem

Since energy of a high-temperature flue gas is consumed to heat and evaporate a low-temperature coolant if the difference between the temperature of the coolant and the saturated steam temperature of the superheated steam is great, there are problems that a loss of energy occurs and heat efficiency decreases.

The present invention is made to solve the above-described problems, and an object thereof is to provide a boiler, a combined cycle plant, and a steam cooling method for a boiler capable of decreasing the loss of energy of the flue gas when the superheated steam is cooled and preventing heat efficiency from being decreased.

Solution to Problem

In order to achieve the above-described object, according to an aspect of the present invention, there is provided a boiler including: an economizer which heats water supplied by a water supply pump; an evaporator which evaporates the water which is heated by the economizer; and a cooling device which mixes water, as a coolant, which has passed through the economizer via the water supply pump with steam.

According to the boiler, since the water which has passed through the economizer via the water supply pump is mixed with the steam as a coolant, a high-temperature coolant is mixed with superheated steam. Therefore, compared to a case where water supplied to the inlet of the economizer is used as a coolant, it is possible to decrease energy consumed to heat the coolant during the mixing, and it is possible to increase a steam amount at the outlet of the boiler. As a result, it is possible to decrease a loss of energy of a flue gas when the superheated steam is cooled, and it is possible to prevent heat efficiency from being decreased.

In addition, the boiler of the present invention may further include a drum into which water heated by the economizer flows and which is connected to the evaporator, and the cooling device may extract the coolant from a connection line which connects the economizer and the drum to each other.

According to this boiler, it is possible to extract the coolant at a position at which the pressure of the water supplied by the water supply pump is high, and it is possible to reliably supply the coolant to the superheated steam having a high pressure.

Moreover, in the boiler of the present invention, a flow regulation valve may be provided in the connection line, and the cooling device may extract the coolant from a portion of the connection line located between the economizer and the flow regulation valve.

According to this boiler, it is possible to extract the coolant at a position at which the pressure of the water supplied by the water supply pump is high, and it is possible to reliably supply the coolant to the superheated steam having a high pressure.

In addition, the boiler of the present invention may further include a superheater which superheats the steam delivered from the evaporator to generate superheated steam, and the cooling device may supply the coolant to an inlet side of the superheater.

According to this boiler, since the coolant is supplied to the inlet side of the superheater which generates the superheated steam, it is possible to reliably cool the generated superheated steam.

In addition, in the boiler of the present invention, the superheater may include a first superheater which superheats the steam delivered from the evaporator, and a second superheater which further superheats the superheated steam delivered from the first superheater, and the cooling device may supply the coolant to a portion between the first superheater and the second superheater.

According to this boiler, in a case where the superheater includes the first superheater and the second superheater, since the coolant is supplied to the portion between the first superheater and the second superheater, it is possible to reliably cool the generated superheated steam.

Moreover, according to another aspect of the present invention, there is provided a combined cycle plant including: a gas turbine; any one of the above-described boilers having a flue gas discharged from the gas turbine as a heat source; a steam turbine which is driven by steam generated by the boiler; a condenser which condenses steam via the steam turbine; and a condensate pump which supplies the condensate from the condenser to the boiler.

According to this combined cycle plant, since the water which has passed through the economizer via the water supply pump is mixed with the steam as a coolant, a high-temperature coolant is mixed with superheated steam. Therefore, compared to a case where water supplied to the inlet of the economizer is used as a coolant, it is possible to decrease energy consumed to heat the coolant during the mixing, and it is possible to increase a steam amount at the outlet of the boiler. As a result, it is possible to decrease a loss of energy of a flue gas when the superheated steam is cooled, and it is possible to prevent heat efficiency from being decreased.

Moreover, according to still another aspect of the present invention, there is provided a steam cooling method for a boiler including an economizer which heats water supplied by a water supply pump and an evaporator which evaporates the water heated by the economizer, the method including extracting the water having passed through the economizer via the water supply pump and mixing the water, as a coolant, with steam delivered from the evaporator.

According to this steam cooling method for a boiler, since the water which has passed through the economizer via the water supply pump is mixed with the steam as a coolant, a high-temperature coolant is mixed with superheated steam. Therefore, compared to a case where water supplied to the inlet of the economizer is used as a coolant, it is possible to decrease energy consumed to heat the coolant during the mixing, and it is possible to increase a steam amount at the outlet of the boiler. As a result, it is possible to decrease a loss of energy of a flue gas when the superheated steam is cooled, and it is possible to prevent heat efficiency from being decreased.

Advantageous Effects of Invention

According to the present invention, it is possible to decrease a loss of energy of a flue gas when superheated steam is cooled, and it is possible to prevent heat efficiency from being decreased.

BRIEF DESCRIPTION OF DRAWINGS

FIG. 1 is a schematic configuration view showing an example of a boiler according to an embodiment of the present invention.

DESCRIPTION OF EMBODIMENTS

Figure 2:
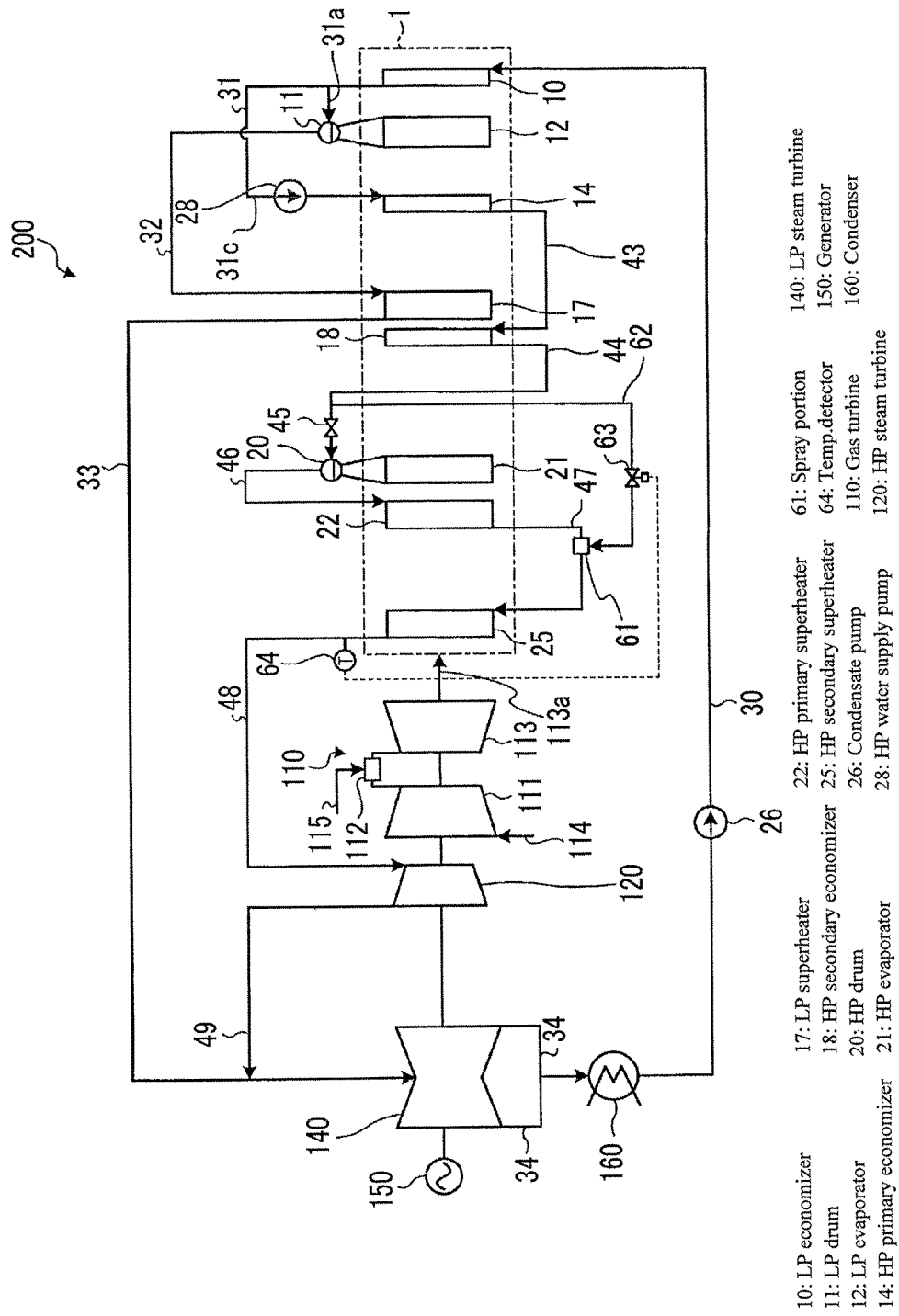
FIG. 2 is a schematic configuration view showing another example of the boiler according to the embodiment of the present invention.

Hereinafter, an embodiment of the present invention will be described in detail with reference to the drawings. However, the present invention is not limited by the embodiment. Moreover, components of the following embodiment include components which can be easily replaced by a person skilled in the art and substantially the same components.

FIG. 1 is a schematic configuration view showing an example of a boiler according to the present embodiment. For example, as shown in FIG. 1, a boiler 1 of the present embodiment is applied to a combined cycle plant 100. The combined cycle plant 100 shown in FIG. 1 is configured of a gas turbine 110, a high-pressure steam turbine 120, a medium-pressure steam turbine 130, and a low-pressure steam turbine 140, and the gas turbine 110, the high-pressure steam turbine 120, the medium-pressure steam turbine 130, and the low-pressure steam turbine 140 are coaxially disposed with a generator 150.

The gas turbine 110 is configured of a compressor 111, a combustor 112, and a turbine 113. In the compressor 111, compressor inlet air 114 is pressurized to be supplied to the combustor 112. In the combustor 112, a high-temperature combustion gas is generated by the supplied air and a fuel 115 to be supplied to the turbine 113. After the combustion gas passing through the turbine 113 rotates the turbine 113, the combustion gas is discharged as a flue gas.

The boiler 1 of the present embodiment is configured as an exhaust heat recovery boiler, and the boiler 1 generates superheated steam from water using the flue gas discharged from the turbine 113 in the gas turbine 110 as a heat source. The high-pressure steam turbine 120, the medium-pressure steam turbine 130, and the low-pressure steam turbine 140 which are steam turbines are driven by the superheated steam. In addition, the gas turbine 110, the high-pressure steam turbine 120, the medium-pressure steam turbine 130, and the low-pressure steam turbine 140 are driven, and thereby electricity is generated by the generator 150. In addition, the steam used in the low-pressure steam turbine 140 is condensed by a condenser 160 connected to the low-pressure steam turbine 140, and the condensate is supplied to the boiler 1 as water so as to generate the superheated steam.

The boiler 1 is connected to a flue 113a which is provided on the exhaust side of the turbine 113 in the gas turbine 110. In the boiler 1, a low-pressure economizer 10, a low-pressure drum 11, a low-pressure evaporator 12, a medium-pressure economizer 13, a high-pressure primary economizer 14, a medium-pressure drum 15, a medium-pressure evaporator 16, a low-pressure superheater 17, a high-pressure secondary economizer 18, a medium-pressure superheater 19, a high-pressure drum 20, a high-pressure evaporator 21, a high-pressure primary superheater 22, a primary reheater 23, a secondary reheater 24, and a high-pressure secondary superheater 25 are provided from the downstream side in the flow of the flue gas, and a condensate pump 26, a medium-pressure water supply pump 27, and a high-pressure water supply pump 28 are provided.

The boiler 1 includes a low-pressure system which generates low-pressure superheated steam to drive the low-pressure steam turbine 140, a medium-pressure system which generates medium-pressure superheated steam to drive the medium-pressure steam turbine 130, and a high-pressure system which generates high-pressure superheated steam to drive the high-pressure steam turbine 120. In addition, the low-pressure system is configured of the low-pressure economizer 10, the low-pressure drum 11, the low-pressure evaporator 12, the low-pressure superheater 17, and the condensate pump 26; the medium-pressure system is configured of the medium-pressure economizer 13, the medium-pressure drum 15, the medium-pressure evaporator 16, the medium-pressure superheater 19, the primary reheater 23, the secondary reheater 24, and the medium-pressure water supply pump 27; and the high-pressure system is configured of the high-pressure primary economizer 14, the high-pressure secondary economizer 18, the high-pressure drum 20, the high-pressure evaporator 21, the high-pressure primary superheater 22, the high-pressure secondary superheater 25, and the high-pressure water supply pump 28.

In the low-pressure system, the low-pressure economizer 10 is connected to the condenser 160 by a connection line 30. The condensate pump 26 is provided in the connection line 30. In addition, the low-pressure economizer 10 is connected to the low-pressure drum 11 by a low-pressure branch line 31a of the connection line 31 branched into three lines. The low-pressure drum 11 is connected to the low-pressure evaporator 12. In addition, the low-pressure drum 11 is connected to the low-pressure superheater 17 by a connection line 32. The low-pressure superheater 17 is connected to the inlet side of the low-pressure steam turbine 140 by a connection line 33. The outlet side of the low-pressure steam turbine 140 is connected to the condenser 160 by a connection line 34.

That is, in the low-pressure system, water (condensate) of the condenser 160 flows into the low-pressure economizer 10 via the connection line 30 by the condensate pump 26 so as to be heated, and the water flows into the low-pressure drum 11 via the low-pressure branch line 31a of the connection line 31. The water supplied to the low-pressure drum 11 is evaporated by the low-pressure evaporator 12 so as to be saturated steam, is returned to the low-pressure drum 11, and is delivered to the low-pressure superheater 17 via the connection line 32. The saturated steam is superheated by the low-pressure superheater 17, and the superheated steam is supplied to the low-pressure steam turbine 140 via the connection line 33. The steam which drives the low-pressure steam turbine 140 and is discharged is guided to the condenser 160 via the connection line 34 so as to be water (condensate), and the condensate is delivered to the low-pressure economizer 10 via the connection line 30 by the condensate pump 26.

In the medium-pressure system, the medium-pressure economizer 13 is connected to the low-pressure economizer 10 by a medium-pressure branch line 31*b* of the connection line 31 branched into three lines. The medium-pressure water supply pump 27 is provided in the medium-pressure branch line 31*b*. In addition, the medium-pressure economizer 13 is connected to the medium-pressure drum 15 by a connection line 35. A flow regulation valve 36 is provided in the intermediate portion of the connection line 35. The medium-pressure drum 15 is connected to the medium-pressure evaporator 16. Moreover, the medium-pressure drum 15 is connected to the medium-pressure superheater 19 by a connection line 37. The medium-pressure superheater 19 is connected to the inlet side of the primary reheater 23 by a connection line 38. Moreover, in the medium-pressure system, the primary reheater 23 is connected to the outlet side of the high-pressure steam turbine 120 by a connection line 40. In addition, the primary reheater 23 is connected to the secondary reheater 24 by a connection line 41. In addition, the secondary reheater 24 is connected to the inlet side of the medium-pressure steam turbine 130 by a connection line 42. The outlet side of the medium-pressure steam turbine 130 is connected to the inlet side of the low-pressure steam turbine 140 by a connection line 39.

That is, in the medium-pressure system, water heated by the low-pressure economizer 10 flows into the medium-pressure economizer 13 via the medium-pressure branch line 31*b* of the connection line 31 by the medium-pressure water supply pump 27 so as to be further heated, and the water flows into the medium-pressure drum 15 via the connection line 35. The water supplied to the medium-pressure drum 15 is evaporated by the medium-pressure evaporator 16 so as to be saturated steam, is returned to the medium-pressure drum 15, and is delivered to the medium-pressure superheater 19 via the connection line 37. The saturated steam is superheated by the medium-pressure superheater 19, and the superheated steam is supplied to the primary reheater 23 via the connection line 38. In addition, in the medium-pressure system, the steam which drives the high-pressure steam turbine 120 and is discharged therefrom is delivered to the primary reheater 23 via the connection line 40. The steam is superheated by the primary reheater 23, and the superheated steam is delivered to the secondary reheater 24 via the connection line 41. The steam is further superheated by the secondary reheater 24, and the superheated steam is supplied to the medium-pressure steam turbine 130 via the connection line 42. Moreover, the steam which drives the medium-pressure steam turbine 130 and is discharged therefrom is supplied to the low-pressure steam turbine 140 via the connection line 39.

In addition, since the primary reheater 23 and the secondary reheater 24 superheat steam, the primary reheater 23 and the secondary reheater 24 have the function similar to that of the superheater, and in the present embodiment, are included in the superheater. In addition, in the present embodiment, the primary reheater (first superheater) 23 and the secondary reheater (second superheater) 24 having the functions included in the superheater are disposed in series in the medium-pressure system. However, the primary reheater 23 and the secondary reheater 24 may be one superheater. In this case, one superheater is connected to the outlet side of the high-pressure steam turbine 120 by the connection line 40, and is connected to the inlet side of the medium-pressure steam turbine 130 by the connection line 42.

In the high-pressure system, the high-pressure primary economizer 14 is connected to the low-pressure economizer 10 by a high-pressure branch line 31*c* of the connection line 31 branched into three lines. The high-pressure water supply pump 28 is provided in the high-pressure branch line 31*c*. Moreover, the high-pressure primary economizer 14 is connected to the high-pressure secondary economizer 18 by a connection line 43. The high-pressure secondary economizer 18 is connected to the high-pressure drum 20 by a connection line 44. The flow regulation valve 45 is provided in the intermediate portion of the connection line 44. The high-pressure drum 20 is connected to the high-pressure evaporator 21. Moreover, the high-pressure drum 20 is connected to the high-pressure primary superheater 22 by a connection line 46. The high-pressure primary superheater 22 is connected to the high-pressure secondary superheater 25 by a connection line 47. The high-pressure secondary superheater 25 is connected to the inlet side of the high-pressure steam turbine 120 by a connection line 48. As described above, the outlet side of the high-pressure steam turbine 120 is connected to the primary repeater 23 of the medium-pressure system by the connection line 40.

That is, in the high-pressure system, water heated by the low-pressure economizer 10 flows into the high-pressure primary economizer 14 via the high-pressure branch line 31*c* of the connection line 31 by the high-pressure water supply pump 28 so as to be further heated, flows into the high-pressure secondary economizer 18 via the connection line 43 so as to be further heated, and flows into the high-pressure drum 20 via the connection line 44. The water supplied to the high-pressure drum 20 is evaporated by the high-pressure evaporator 21 so as to be saturated steam, is returned to the high-pressure drum 20, and is delivered to the high-pressure primary superheater 22 via the connection line 46. The saturated steam is superheated by the high-pressure primary superheater 22, and the superheated steam is delivered to the high-pressure secondary superheater 25 via the connection line 47. The superheated steam is further superheated by the high-pressure secondary superheater 25, and the superheated steam is supplied to the high-pressure steam turbine 120 via the connection line 48.

In addition, in the present embodiment, the high-pressure primary superheater (first superheater) 22 and the high-pressure secondary superheater (second superheater) 25 are disposed in series in the high-pressure system. However, the high-pressure primary superheater 22 and the high-pressure secondary superheater 25 may be one superheater. In this case, one superheater is connected to the high-pressure drum 20 by the connection line 46, and is connected to the inlet side of the high-pressure steam turbine 120 by the connection line 48. In addition, in the present embodiment, the high-pressure primary economizer 14 and the high-pressure secondary economizer 18 are disposed in series in the high-pressure system. However, the high-pressure primary economizer 14 and the high-pressure secondary economizer 18 may be one economizer. In this case, one economizer is connected to the low-pressure economizer 10 via the high-pressure water supply pump 28 by the high-pressure branch line 31c of the connection line 31, and is connected to the high-pressure drum 20 by the connection line 44.

A cooling device is provided in the boiler 1. The cooling device is provided in each of the medium-pressure system and the high-pressure system. In a case where the temperature of the superheated steam delivered from the secondary repeater 24 to the connection line 42 in the medium-pressure system or the temperature of the superheated steam delivered from the high-pressure secondary superheater 25 to the connection line 48 in the high-pressure system is higher than a set temperature, the cooling device decreases the temperature of the superheated steam by supplying a coolant to the medium-pressure system or the high-pressure system.

In the medium-pressure system, the cooling device includes a spray portion 51, a coolant line 52, a regulation valve 53, and a temperature detector 54.

The spray portion 51 is provided in the connection line 41 by which the primary reheater (first superheater) 23 and the secondary reheater (second superheater) 24 are connected to each other, and although it is not shown in the drawings, the spray portion 51 includes a nozzle through which the coolant is sprayed into the connection line 41. Moreover, in the case where the primary reheater (first superheater) 23 and the secondary reheater (second superheater) 24 are one superheater, the spray portion 51 is provided in the connection line 40.

The coolant line 52 supplies the coolant to the spray portion 51. One end of the coolant line 52 is connected to the intermediate portion of the connection line 35 through which water having passed through the medium-pressure branch line 31b from the medium-pressure water supply pump 27 is delivered from the medium-pressure economizer 13 to the medium-pressure drum 15, and the other end of the coolant line 52 is connected to the spray portion 51. More specifically, the one end of the coolant line 52 is connected to a portion between the medium-pressure economizer 13 and the flow regulation valve 36. Accordingly, in the medium-pressure system, the cooling device supplies the water having passed through the medium-pressure economizer 13 via the medium-pressure water supply pump 27 to the spray portion 51 as a coolant.

The regulation valve 53 is provided in the intermediate portion of the coolant line 52, and regulates the flow rate of the coolant supplied to the spray portion 51. In addition, the temperature detector 54 is provided in the connection line 42 to which the outlet side of the secondary repeater (second superheater) 24 or one superheater is connected, and detects the temperature of the superheated steam passing through the connection line 42. In addition, the regulation valve 53 is controlled according to the temperature of the superheated steam detected by the temperature detector 54.

That is, in the cooling device of the medium-pressure system, the regulation valve 53 is controlled based on the temperature detected by the temperature detector 54, and the water having passed through the medium-pressure economizer 13 via the medium-pressure water supply pump 27 is supplied to the spray portion 51 via the coolant line 52 as a coolant. Accordingly, the superheated steam is cooled to a temperature lower than the set temperature.

Meanwhile, in the high-pressure system, the cooling device includes a spray portion 61, a coolant line 62, a regulation valve 63, and a temperature detector 64.

The spray portion 61 is provided in the connection line 47 by which the high-pressure primary superheater (first superheater) 22 and the high-pressure secondary superheater (second superheater) 25 are connected to each other, and although it is not shown in the drawings, the spray portion 61 includes a nozzle through which the coolant is sprayed into the connection line 47. Moreover, in the case where the high-pressure primary superheater (first superheater) 22 and the high-pressure secondary superheater (second superheater) 25 are one superheater, the spray portion 61 is provided in the connection line 48.

The coolant line 62 supplies the coolant to the spray portion 61. One end of the coolant line 62 is connected to the intermediate portion of the connection line 44 through which water having passed through the high-pressure branch line 31c from the high-pressure water supply pump 28 is delivered from the high-pressure secondary economizer 18 or one economizer to the high-pressure drum 20, and the other end of the coolant line 62 is connected to the spray portion 61. More specifically, the one end of the coolant line 62 is connected to a portion between the high-pressure secondary economizer 18 or one economizer and the flow regulation valve 45. Accordingly, in the high-pressure system, the cooling device supplies the water having passed through the high-pressure secondary economizer 18 or one economizer via the high-pressure water supply pump 28 to the spray portion 61 as a coolant.

The regulation valve 63 is provided in the intermediate portion of the coolant line 62, and regulates the flow rate of the coolant supplied to the spray portion 61. In addition, the temperature detector 64 is provided in the connection line 48 to which the outlet side of the high-pressure secondary superheater (second superheater) 25 or one superheater is connected, and detects the temperature of the superheated steam passing through the connection line 48. In addition, the regulation valve 63 is controlled according to the temperature of the superheated steam detected by the temperature detector 64.

That is, in the cooling device of the high-pressure system, the regulation valve 63 is controlled based on the temperature detected by the temperature detector 64, and the water having passed through the high-pressure secondary economizer 18 or one economizer via the high-pressure water supply pump 28 is supplied to the spray portion 61 via the coolant line 62 as a coolant. Accordingly, the superheated steam is cooled to a temperature lower than the set temperature.

Meanwhile, FIG. 2 is a schematic configuration view showing another example of the boiler according to the present embodiment. A combined cycle plant 200 shown in FIG. 2 does not include the medium-pressure steam turbine 130, the medium-pressure system (medium-pressure economizer 13, medium-pressure drum 15, medium-pressure evaporator 16, medium-pressure superheater 19, primary reheater 23, secondary reheater 24, and medium-pressure water supply pump 27) in the boiler 1, the lines 31b, 35, 37, 38, 40, 41, and 42 and the flow regulation valve 36 related to these, and the cooling device (spray portion 51, coolant line 52, regulation valve 53, and temperature detector 54) of the medium-pressure system.

That is, the combined cycle plant 200 shown in FIG. 2 includes the high-pressure steam turbine 120, the high-pressure system of the boiler 1 related to the high-pressure steam turbine 120, and the cooling device of the high-pressure system, and includes the low-pressure steam turbine 140, the low-pressure system of the boiler 1 related to the low-pressure steam turbine 140, and the cooling device of the low-pressure system. Accordingly, in the combined cycle plant 200 and the boiler 1 shown in FIG. 2, the same reference numerals are assigned to the same portions, and descriptions thereof are omitted. In the combined cycle plant 200, the outlet side of the high-pressure steam turbine 120 is connected to the inlet side of the low-pressure steam turbine 140 by the connection line 49, and the steam which drives the high-pressure steam turbine 120 and is discharged therefrom is supplied to the low-pressure steam turbine 140 via the connection line 49.

As described above, the boiler 1 of the present embodiment includes the economizer (medium-pressure economizer 13 and high-pressure secondary economizer 18 (or one economizer)) which heats water supplied by the water supply pump (medium-pressure water supply pump 27 and high-pressure water supply pump 28), the evaporator (medium-pressure evaporator 16 and high-pressure evaporator 21) which evaporates the water heated by the economizer, and the cooling device (medium-pressure system and high-pressure system) which mixes the water, as a coolant, which has passed through the economizer via the water supply pump with steam.

According to this boiler 1, since the water which has passed through the economizer via the water supply pump is mixed with steam as a coolant, a high-temperature coolant is mixed with the superheated steam. Accordingly, compared to a case where the water at the inlet of the economizer is used as a coolant, it is possible to decrease energy consumed to heat the coolant during the mixing, and it is possible to increase a steam amount at the outlet of the boiler. As a result, it is possible to decrease a loss of energy of a flue gas when the superheated steam is cooled, and it is possible to prevent heat efficiency from being decreased. Moreover, according to this boiler 1, since a high-temperature coolant is mixed with superheated steam, a time until the coolant is evaporated in superheated steam decreases, and it is possible to improve controllability of the cooling of the superheated steam. In addition, according to the boiler 1, since a high-temperature coolant is mixed with superheated steam, the time until the coolant is evaporated in superheated steam decreases, so that it is possible to decrease a length of a straight part of a pipe which prevents a high-temperature coolant from colliding with the inner peripheral wall of the pipe, and it is possible to relax limitation of the disposition.

Moreover, preferably, the boiler 1 of the present embodiment includes the drum (medium-pressure drum 15 and high-pressure drum 20) into which water heated by the economizer (medium-pressure economizer 13 and high-pressure secondary economizer 18 (or one economizer)) flows and which is connected to the evaporator (medium-pressure evaporator 16 and high-pressure evaporator 21), and the cooling device extracts the coolant from the connection line (connection lines 35 and 44) which connects the economizer and the drum to each other. Accordingly, it is possible to extract the coolant at a position at which the pressure of the water supplied by the water supply pump (medium-pressure water supply pump 27 and high-pressure water supply pump 28) is high, and it is possible to reliably supply the coolant to the superheated steam having a high pressure.

In addition, preferably, in the boiler 1 of the present embodiment, the flow regulation valve (flow regulation valves 36 and 45) is provided in the connection line (connection lines 35 and 44), and the cooling device extracts the coolant from a portion of the connection line located between the economizer and the flow regulation valve. Accordingly, it is possible to extract the coolant at a position at which the pressure of the water supplied by the water supply pump (medium-pressure water supply pump 27 and high-pressure water supply pump 28) is high, and it is possible to reliably supply the coolant to the superheated steam having a high pressure.

In addition, preferably, the boiler 1 of the present embodiment includes the superheater (secondary repeater 24 or one superheater in the medium-pressure system and the high-pressure secondary superheater 25 or one superheater in the high-pressure system) which superheats the steam delivered from the evaporator (medium-pressure evaporator 16 and high-pressure evaporator 21) to generate superheated steam, and the cooling device supplies the coolant to an inlet side of the superheater. Accordingly, since the coolant is supplied to the inlet side of the superheater which generates the superheated steam, it is possible to reliably cool the generated superheated steam.

Moreover, preferably, in the boiler 1 of the present embodiment, the superheater includes the first superheater (primary reheater 23 in the medium-pressure system and high-pressure primary superheater 22 in the high-pressure system) which superheats the steam delivered from the evaporator (medium-pressure evaporator 16 and high-pressure evaporator 21), and the second superheater (secondary reheater 24 in the medium-pressure system and high-pressure secondary superheater 25) which further superheats the superheated steam delivered from the first superheater, and the cooling device supplies the coolant to a portion between the first superheater and the second superheater. Accordingly, in a case where the superheater includes the first superheater and the second superheater, since the coolant is supplied to the portion between the first superheater and the second superheater, it is possible to reliably cool the generated superheated steam.

REFERENCE SIGNS LIST

1: boiler
10: low-pressure economizer
11: low-pressure drum
12: low-pressure evaporator
13: medium-pressure economizer
14: high-pressure primary economizer
15: medium-pressure drum
16: medium-pressure evaporator
17: low-pressure superheater
18: high-pressure secondary economizer
19: medium-pressure superheater
20: high-pressure drum
21: high-pressure evaporator
22: high-pressure primary superheater
23: primary reheater
24: secondary reheater
25: high-pressure secondary superheater
26: condensate pump
27: medium-pressure water supply pump
28: high-pressure water supply pump
30, 31, 32, 33, 34, 35, 37, 38, 39, 40, 41, 42, 43, 44, 46, 47, 48, 49: connection line
36, 45: flow regulation valve
51, 61: spray portion
52, 62: coolant line
53, 63: regulation valve
54, 64: temperature detector
100, 200: combined cycle plant
110: gas turbine
120: high-pressure steam turbine
130: medium-pressure steam turbine
140: low-pressure steam turbine
150: generator
160: condenser

The invention claimed is:

1. A boiler comprising:
   a water supply pump;
   a first economizer for heating water supplied by the water supply pump;
   a first evaporator for evaporating first water that is the water heated by the first economizer;
   a second economizer for receiving second water that is a part of the first water passed through the first economizer, wherein the second economizer heats the second water provided from the first economizer;
   a second evaporator for evaporating a part of the second water heated by the second economizer;
   a first cooling device for mixing a part of the second water, as a coolant, that has passed through the second economizer via the water supply pump with steam from the second evaporator;
   a third economizer for receiving third water, which is a part of the first water passed through the first economizer and pressurized at higher pressure than the second water, wherein the third economizer heats the third water;
   a third evaporator for evaporating a part of the third water heated by the third economizer, and
   a second cooling device for mixing a part of the third water, as a coolant, which has passed through the third economizer via the water supply pump with steam from the third evaporator.

2. The boiler according to claim 1, further comprising:
   a drum for receiving the part of the second water heated by the second economizer, the drum being connected to the second evaporator,
   wherein the first cooling device extracts the coolant from a connection line connecting the second economizer and the drum to each other.

3. The boiler according to claim 2, wherein a flow regulation valve is provided in the connection line, and the first cooling device extracts the coolant from a portion of the connection line located between the second economizer and the flow regulation valve.

4. The boiler according to claim 1, further comprising:
   a superheater for superheating the steam delivered from the second evaporator to generate superheated steam, and
   wherein the first cooling device supplies the coolant to an inlet side of the superheater.

5. The boiler according to claim 4, wherein the superheater includes a first superheater for superheating the steam delivered from the second evaporator, and a second superheater for further superheating the superheated steam delivered from the first superheater, and the first cooling device supplies the coolant to a portion between the first superheater and the second superheater.

6. A combined cycle plant comprising:
   a gas turbine;
   the boiler according to claim 1 having a flue gas discharged from the gas turbine as a heat source;
   a steam turbine driven by steam generated by the boiler;
   a condenser for condensing steam via the steam turbine; and
   a condensate pump for supplying the condensate from the condenser to the boiler.

7. A steam cooling method for a boiler including:
   a first economizer for heating water supplied by a water supply pump;
   a first evaporator for evaporating first water that is the water heated by the first economizer;
   a second economizer for receiving second water that is a part of the first water passed through the first economizer, wherein the second economizer heats the second water provided;
   a second evaporator for evaporating a part of the second water heated by the second economizer;
   a first cooling device for mixing a part of the second water;
   a third economizer for receiving third water, which is a part of the first water passed through the first economizer and pressurized at higher pressure than the second water, wherein the third economizer heats the third water;
   a third evaporator for evaporating a part of the third water heated by the third economizer; and
   a second cooling device for mixing a part of the third water, as a coolant, which has passed through the third economizer via the water supply pump with steam from the third evaporator,
   the steam cooling method comprising:
   extracting the part of the second water having passed through the second economizer via the water supply pump; and
   mixing, in the first cooling device, the part of the second water, as a coolant, that has passed through the second economizer with steam from the second evaporator.

* * * * *